Patented Nov. 28, 1939

2,181,299

UNITED STATES PATENT OFFICE 2,181,299

MICROPOROUS SEPARATOR AND PROCESS OF MAKING THE SAME

William J. Burgess, Palmyra, N. J., assignor to The Electric Storage Battery Company, Philadelphia, Pa., a corporation of New Jersey No Drawing. Application May 18, 1936, Serial No. 80,421

4 Claims. (Cl. 18—53)

This invention provides a novel process for making electrolytic permeable diaphragms useful as separators or retainers of active material in a storage battery in which process finely divided inert material is united into a solid, semipliable porous mass by a comparatively small proportion of an adhesive binder, such as rubber, the latter being set as by vulcanization to hard rubber or by a similar transformation, if other binders than rubber are employed, as the final step in the process.

My invention is also directed to the novel product of this process.

A number of processes have heretofore been proposed for producing microporous diaphragms. In the process described in Beckmann Patent No. 1,745,657, rubber latex is coagulated into a three-dimensional, symmetrical, reticulate structure, which structure is maintained by retaining the liquid of the continuous phase of the emulsion enmeshed in the net resulting from the coagulation of the rubber particles throughout the process until that net structure has been permanently fixed by vulcanization.

It has been proposed to add a finely divided inert filler to the Beckmann material, retaining the reticulate structure of the rubber to provide porosity. The addition of any considerable amount of such filler obstructs the pores and reduces the tensile strength of the product, rendering it unfit for use in a storage battery. That this modification of the Beckmann process is impracticable is evidenced by the fact that, notwithstanding the obvious reduction in cost, resulting from the substitution of an inexpensive filler for the more expensive rubber, it has never been put into commercial use by the large manufacturers of the Beckmann separator.

I have discovered that all the important characteristics of a successful separative diaphragm for storage batteries, such as ionic permeability, mechanical strength, the desirable combination of rigidity and pliability and resistance to electrolytic oxidation, can be secured by the selection of certain materials and the introduction of certain novel steps in the process, permitting the use of a major proportion of inexpensive filler and a minor proportion of the more expensive binder.

My invention is especially directed to the use, as a filler, of a certain class of inert substances termed hydrophilic colloids, as described by the Bureau of Standards, Technical Paper No. 438. In my copending application, Serial No. 718,209, I have disclosed the use of such fillers compounded with gum rubber. I have discovered that a very similar product can be obtained starting with rubber latex, by the introduction of a certain novel combination of steps in the process.

As described in my copending application above referred to, the hydrophilic colloids employed in this process have a strong affinity for water with which they appear to combine either by adsorption or in other waps not fully understood. These fillers include such diversified products as clays of the bentonite or zeolite type, artificial zeolites, such as "permutit", comminuted and thoroughly pulverized cellulosic material, gums capable of forming a gel with water, such as tragacanth, agar-agar, karaya, and gelatine, and gels of the silica type, added as such or formed in situ. These hydrophilic colloids may be divided into two classes. In the case of the gels, the water is taken up by the substance itself, causing the individual particles to swell. In the case of the clays, the water is attracted to the surfaces of the particles and adheres as a film, causing an apparent and equivalent increase in the particle size.

Briefly stated, the process, if rubber latex is employed as the source of the binder, consists in thoroughly mixing the latex with the hydrophilic colloid in such proportion as to provide approximately from 60% to 80% of the filler by weight in the finished product and with enough sulphur for vulcanization to hard rubber. Care must be taken to avoid premature coagulation of the rubber latex, introducing, if necessary, a coagulation inhibitor such as ammonium linoleate. The addition of a small percentage of alpha-cellulose is beneficial in facilitating calendering to exact dimensions. The mixture is then dried until the moisture content is reduced to about 5% by weight. The mass is then rolled into plain or ribbed sheets, or it may be extruded into tubular form or otherwise mechanically compressed. The material is then subjected to an excess of moisture by soaking or spraying with water, which will be absorbed to the extent of about 25% by weight. At this state, the porosity of the material as indicated by its ionic permeability is almost negligible (10% of wood). The material is then vulcanized in the presence of moisture, during which process electrolytic permeability of a high order is developed.

As a concrete example of the process of my invention, the following is presented:

| | Pounds |
|---|---|
| Rubber latex, 40% rubber content | 80 |
| Sulfur | 9.4 |
| Ammonium linoleate | 2.2 |
| Bentonite | 12.5 |
| Sodium silicate solution, 1.400 sp. gr. | 93.0 |
| Alpha cellulose | 18.8 |

Mix in a suitable mixer for 1 hour. The resulting mass should have the consistency of a stiff dough. Spread the mixture on a suitable support in a layer about ½ inch thick and air dry at a temperature of approximately 170° F. Roll in a mill by several passes to a thickness of 0.02 inch. If a ribbed diaphragm is desired, the last set of rolls employed may be grooved. Soak in water acidulated with sulphuric acid and of about 1.025 specific gravity at 80° F., for 24 hours. Vulcanize under the necessary pressure to maintain a temperature of 325° F., for 4 to 8 hours.

The following theory is submitted as a reasonable explanation of the phenomena which take place during the process described.

The amount of rubber specified is sufficient substantially to fill the voids between the particles of dry bentonite, though possibly insufficient to fill the voids after swelling. By preventing coagulation of the latex, the particles of rubber are thoroughly dispersed throughout the mass by the mixing operation. When the mass is dried and rolled, these rubber particles are consolidated into a more or less continuous concatenated structure surrounding the bentonite particles and partly or nearly filling the voids between them, these hydrophylic particles having then given up the water with which they were originally impregnated from the liquid phase of the emulsion. During the subsequent soaking, the water penetrates into the particles of bentonite (either by passing through the few interstices in the rubber or more likely by penetrating by molecular diffusion the thin films of rubber surrounding the bentonite particles), causing the latter to swell, putting the rubber in tension without disrupting it. During the subsequent vulcanization to hard rubber, the elasticity of the rubber disappears and, by reason of the stretching which has occurred, disruption of the rubber takes place, producing innumerable microscopic pores.

Where a binder other than rubber is employed, the sulphur is of course omitted but the setting operation, while not vulcanization in the commonly accepted meaning of that term, is substantially the same, consisting in the application of heat in the presence of moisture in an autoclave. It is believed that the high temperature and the retention of the liquid in the material in association with the hydrophilic colloid are the important factors in this step. It is further believed that the development of the high degree of permeability during this setting step is due to the fact that the binding material becomes highly dispersed, forming the attenuated concatenated structure observable in the product.

An important function of the hydrophilic colloid in this process resides in the fact that it prevents the development of the natural water-repellent characteristic of the binder, so that the material will absorb water at all stages of the process.

When sectioned and viewed under the microscope, the concatenated aggregations of the binder are much in evidence even where present to the extent of only 20% to 30%, and if the hydrophilic filler is dissolved out, as for example by treating with hydrofluoric acid, the voids are distinctly visible and in marked contrast with the sub-microscopic pores in the product of the Beckmann process.

The final rolling or similar mechanical working of the material before soaking and setting also introduces a distinct difference in structure in longitudinal section from that shown by cross-section, the former exhibiting numerous elongated aggregations and pores, thus presenting a distinctly asymmetrical three-dimensional structure.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. The process of making electrolytically permeable separative diaphragms possessed of mechanical strength and resistant to electrolytic oxidation which consists in mixing latex with a hydrophilic colloid and sulphur in sufficient quantity for vulcanization to hard rubber, drying the admixture until the moisture content is reduced to about 5% by weight, consolidating the dried admixture by the application of pressure, wetting the consolidated mass, and vulcanizing the mass in the presence of moisture thereby producing electrolytic permeability of a high order.

2. The process of making electrolytically permeable separative diaphragms possessed of mechanical strength and resistant to electrolytic oxidation which consists in mixing a hydrophilic colloid with a liquid dispersion of a plastic binder, drying and compressing the admixture, wetting the dried and compressed mass, and setting the binder.

3. The process of making electrolytically permeable diaphragms possessed of mechanical strength and resistant to electrolytic oxidation which consists in mixing latex with hydrophilic colloid in such proportion as to provide from 60% to 80% of the colloid by weight in the finished product and sulphur in sufficient quantity for vulcanization to hard rubber and a coagulation inhibitor such as ammonium linoleate, drying the admixture until the moisture content is reduced to about 5% by weight, compressing the dried admixture into a coherent mass, wetting the compressed mass of which the permeability at this stage is practically negligible, and vulcanizing the mass in the presence of moisture thereby producing electrolytic permeability of a high order.

4. An electrolytically permeable separative diaphragm possessing mechanical strength and resistant to the electrolytic action in a storage battery cell, said diaphragm being the product of the process which consists in mixing a hydrophilic colloid with a liquid dispersion of a plastic binder, drying and compressing the admixture, wetting the dried and compressed mass and setting the binder, and in said diaphragm the particles of colloid being bound together by particles of binder partially filling the voids and in the form of a non-symmetrical structure characterized by elongated chain like aggregations.

WILLIAM J. BURGESS.